United States Patent
Grove (10) Patent No.: US 9,915,393 B2
(45) Date of Patent: Mar. 13, 2018

(54) MOBILE DEVICE SUPPORT WITH FINGER CLEARANCE

(71) Applicant: Evan Bingham Grove, New York, NY (US)

(72) Inventor: Evan Bingham Grove, New York, NY (US)

( * ) Notice: Subject to any disclaimer, the term of this patent is extended or adjusted under 35 U.S.C. 154(b) by 0 days.

(21) Appl. No.: 14/937,280

(22) Filed: Nov. 10, 2015

(65) Prior Publication Data
US 2017/0127822 A1    May 11, 2017

(51) Int. Cl.
| F16M 13/04 | (2006.01) |
| F16M 13/00 | (2006.01) |
| F16M 11/20 | (2006.01) |
| F16B 1/00 | (2006.01) |

(52) U.S. Cl.
CPC ........ *F16M 11/2021* (2013.01); *F16M 13/00* (2013.01); *F16M 13/04* (2013.01); *F16B 2001/0035* (2013.01)

(58) Field of Classification Search
CPC ............ Y10S 248/91; A47G 2400/083; F16M 2200/04; F16M 11/2021; F16M 13/00; F16M 13/04; F16B 2001/0035
USPC ............................ 248/444, 346.1, 346.2, 323
See application file for complete search history.

(56) References Cited

U.S. PATENT DOCUMENTS

| 2,388,435 | A | * | 11/1945 | Puerner | A47G 1/142 |
| | | | | | 248/444.1 |
| D265,559 | S | * | 7/1982 | Janda | D14/149 |
| 4,346,895 | A | * | 8/1982 | Brownlee | A63F 1/10 |
| | | | | | 248/694 |
| D276,229 | S | * | 11/1984 | Heilner | D14/253 |
| 4,544,158 | A | * | 10/1985 | Kilmonis | A63F 3/06 |
| | | | | | 248/444.1 |
| D324,515 | S | * | 3/1992 | Harden | D14/451 |
| D338,471 | S | * | 8/1993 | Evenson | D14/251 |
| D414,166 | S | * | 9/1999 | De Paris | D14/447 |

(Continued)

OTHER PUBLICATIONS

Craziestgadgets.com, http://craziestgadgets.com/2012/03/02/horse-shoe-magnet-iphone-stand, Mar. 3, 2012.*

*Primary Examiner* — Muhammad Ijaz
(74) *Attorney, Agent, or Firm* — Michael J. Feigin, Esq.; Feigin and Fridman (57) ABSTRACT

A mobile device support is provided herein. The support may include a support element having a support surface having first and second longitudinal ends, the support surfacing supporting a mobile device that operably rests thereon. The support may include a base connected to the support element. The base may be operable to rest on an underlying surface defining a contact plane. The base stably positions the support element holding the mobile device. The support surface defines a gap that interrupts the support surface between the longitudinal ends. The gap opens laterally with respect to the support surface, while providing a clearance above the base that is sufficiently large to enable a user to insert at least a finger into the gap between the longitudinal ends and between the base and the mobile device. The gap allows the user to directly grasp the mobile device from both a face up side and a face down side when the mobile device rests on the support surface.

2 Claims, 11 Drawing Sheets

(56) References Cited

U.S. PATENT DOCUMENTS

| | | | | |
|---|---|---|---|---|
| 6,330,992 B1 * | 12/2001 | Swayhoover | ......... | F16M 13/00 248/230.8 |
| D654,493 S * | 2/2012 | Baumann | ..................... | D14/253 |
| 8,171,664 B2 * | 5/2012 | Buncher | ................. | G09F 3/202 248/122.1 |
| D666,995 S * | 9/2012 | TerMeer | ..................... | D14/217 |
| D677,669 S * | 3/2013 | Liu | .............................. | D14/447 |
| D687,834 S * | 8/2013 | Gittins | ........................ | D14/447 |
| D687,835 S * | 8/2013 | Gittins | ........................ | D14/447 |
| 8,657,248 B2 * | 2/2014 | Rowzee | ................. | A45C 11/00 206/37 |
| D700,888 S * | 3/2014 | Serfoss | ........................ | D13/108 |
| D703,216 S * | 4/2014 | Klepar | ........................ | D14/447 |
| 8,757,374 B1 * | 6/2014 | Kaiser | ..................... | F16M 11/10 206/320 |
| 8,861,714 B1 * | 10/2014 | Leibenhaut | ............. | H04M 1/04 379/446 |
| 8,876,076 B2 * | 11/2014 | Lee | ...................... | F16M 11/105 211/26 |
| 9,041,347 B2 * | 5/2015 | Paschke | ............... | F16M 11/041 320/108 |
| D730,886 S * | 6/2015 | Tseng | .......................... | D14/251 |
| D730,889 S * | 6/2015 | Leibenhaut | .................. | D14/253 |
| D731,474 S * | 6/2015 | Leibenhaut | .................. | D14/253 |
| 9,062,822 B2 * | 6/2015 | Han | ............................. | F16M 11/10 |
| 9,080,716 B2 * | 7/2015 | Mulhern | .............. | F16M 13/022 |
| 9,167,062 B1 * | 10/2015 | Leibenhaut | ......... | H04M 1/0279 |
| 9,307,817 B1 * | 4/2016 | Kaiser | .................... | A45C 11/00 |
| D756,913 S * | 5/2016 | Esses | .......................... | D13/107 |
| 9,642,454 B2 * | 5/2017 | Cannon | ................ | A47B 23/042 |
| D788,778 S * | 6/2017 | Magi | ............................ | D14/434 |
| D799,493 S * | 10/2017 | Grove | .......................... | D14/447 |
| 9,817,446 B2 * | 11/2017 | Voege | ..................... | G06F 1/166 |
| 2009/0184145 A1 * | 7/2009 | Yeh | ........................ | B60R 11/02 224/400 |
| 2010/0320341 A1 * | 12/2010 | Baumann | ............ | B60R 11/0241 248/206.2 |
| 2011/0056413 A1 * | 3/2011 | Andochick | ............ | B42F 9/001 108/14 |
| 2011/0210224 A1 * | 9/2011 | Piccolo | .................... | A47G 1/14 248/346.2 |
| 2012/0261542 A1 * | 10/2012 | Han | ...................... | F16M 11/10 248/346.06 |
| 2013/0119225 A1 * | 5/2013 | Lau | ....................... | G06F 1/1632 248/634 |
| 2013/0175426 A1 * | 7/2013 | Harjani | ............... | F16M 11/041 248/688 |
| 2013/0299668 A1 * | 11/2013 | Von Barner | .......... | G06F 1/1632 248/542 |
| 2014/0291469 A1 * | 10/2014 | Zito | ..................... | F16M 11/046 248/452 |
| 2014/0325818 A1 * | 11/2014 | Mayfield | ............ | F16M 11/041 29/428 |
| 2014/0361130 A1 * | 12/2014 | Fenton | ................ | F16M 11/041 248/176.1 |
| 2016/0142523 A1 * | 5/2016 | Bartkowski | ............ | H04M 1/04 248/441.1 |
| 2017/0127822 A1 * | 5/2017 | Grove | ................ | F16M 11/2021 |
| 2017/0127823 A1 * | 5/2017 | Grove | .................... | A47B 23/04 |
| 2017/0311737 A1 * | 11/2017 | Law | ..................... | F16M 11/041 |

\* cited by examiner

MOBILE DEVICE SUPPORT WITH FINGER CLEARANCE

CROSS-REFERENCE TO RELATED APPLICATIONS

The present application is co-pending with U.S. Patent Application Ser. No. 14/937,563 entitled "MOBILE DEVICE SUPPORT WITH MOVEABLE WEIGHT," which is incorporated herein by reference in its entirety.

TECHNICAL FIELD

Disclosed herein is a support structure. More particularly, the support structure is a mobile device support for positioning mobile devices while allowing access to grasping them by their face and back.

BACKGROUND

Modern mobile electronic devices, particularly ones suitable to be handheld, are capable of accessing and delivering vast amounts of different types of media and information. The overall usefulness of these devices has made them ubiquitous in everyday life. As such, users of these devices have incorporated them into their lifestyle. While many interactions with a mobile device are, as the name would suggest, optimized by holding the device in one or both hands, some interactions are improved by outsourcing the physical support of the device to an independent support structure. Such outsourcing allows a user to maintain a hand-like viewing angle of the device without needing to hold it, thereby freeing the user to perform other one and two-handed tasks (e.g. cooking, eating, drawing, building, playing an instrument, etc.). Support structures, however, are often cumbersome to use and frequently provide inadequate device support and/or viewing angles. Additionally, these support structures do not provide easy access to picking up the device. Modern mobile devices have a very short profile (i.e. side walls), as such they are difficult to pick up from their sides. Typical stands do not offer alternatives to picking these mobile devices up from their sides. These shortcomings can needlessly damage the user's experience by delaying the start of a user's interaction with their device, increasing the likelihood of device drops while the user is placing or removing the device as a result of a poor grip on the device, or otherwise, interrupting, or diminishing from the ongoing multitasking experience. Known support structures rely on shelves, clasps, clamps, straps, special cases, or other hardware to hold the devices in place without providing access to the back of the device for lifting. These additional retention features either increase the difficulty of using the stand or significantly take away from aesthetic appeal.

Additionally, traditional gravity-based support structures are limited in the versatility and usefulness of the mobile device's accessibility when positioned thereon. In one example, U.S. Pat. Pub. No. 2013/0299668 illustrates a stand that provides a continuous back support surface with no access to pick up the mobile device from its back. This is a common issue with laying mobile devices on such stands, desks, tables, pads, or the like in addition to using them with known supports.

In light of the various shortcomings of known stands discussed herein, improved devices that overcome these, as well as other shortcomings, are desirable.

SUMMARY

A mobile device support is provided herein. The support may include a support element having a support surface having first and second longitudinal ends, the support surface supporting a mobile device that operably rests thereon. Each of the longitudinal ends may extend laterally over a width to operably support a lateral width of a manipulable screen area of the mobile device. A base may be connected to the support element and be operable to rest on an underlying surface defining a contact plane. The base may stably position the support element holding the mobile device. The support surface may define a gap that is open laterally to at least one lateral side of the support surface, thereby interrupting the support surface between the longitudinal ends. The gap may provide sufficient clearance below the support surface to enable a user to insert at least a finger into the gap between the longitudinal ends and below the mobile device allowing the user to directly grasp the mobile device from a face thereof that rests on the support surface.

In accordance with various embodiments, the support surface may include a first support portion proximal to the first longitudinal end and a second support portion proximal to the second longitudinal end and the gap is a separation between the first support portion and the second support portion such that the mobile device support is configured to enable grasping around an entire center portion of the mobile device without interference from the mobile device support. In one example, the gap includes a longitudinal length that is at least 2 inches long as measured at the narrowest points between the support surfaces. The gap length allows a user to insert a plurality of fingers into the gap to grasp the mobile device. The first support portion includes a surface that is configured to contact a surface of the mobile device. The second support portion includes a surface that is positioned to support the handheld device along with the first support portion.

In an alternative embodiment, the support surface may be a continuous surface lying in approximately the same plane between the longitudinal ends. The continuous surface may be laterally wider proximal to the longitudinal ends than in a middle portion with the middle portion defining the gap. The continuous surface may form at least one of a C-shape or an I-shape. In accordance with any of the various embodiments, the support surface may be operable to limit movement of the mobile device solely by the friction between the two due only to the weight of the mobile device.

In accordance with various embodiments, the support surfaces and base may be structured such that when the mobile device is positioned on the support surface it fully obstructs the support surfaces and the base. In one example, in the direction perpendicular to the support plane, nothing extends proud of the support surface such that only the mobile device, when positioned thereon, extends from the support surface.

The support may also include a body portion. A first support portion may extend from the body on the first longitudinal end and a second support portion extending from the body on the second longitudinal end and the separation between the first support portion and the second support portion define the gap. The first support portion may be part of the support surface and is laterally wide enough to prevent rotation of the mobile device when positioned thereon and a user is manipulating useable features on the mobile device. The second support portion may be part of the support surface and is laterally wide enough to prevent rotation of the mobile device when positioned thereon and a user is manipulating useable features on the mobile device. The first support portion and the second support portion may extend to opposites longitudinal ends of the mobile device sufficiently provide longitudinal support to the mobile device to limit or prevent the user from knocking the device of the support surface when manipulating useable features on the mobile device.

In accordance with various embodiments, the first support portion and the second support portion may be positioned at different heights relative to the contact plane such that the first device support and the second device support position the mobile device at an angle relative to the contact plane. The support may also include a second base that is at an angle to the first base such that when the second base provides positions the support element relative to the underlying surface the mobile device is positioned at a second angle relative to the contact plane. The first support portion may include an anti-slip element operable to prevent the mobile device from sliding off the first support under its own weight with the surface of the anti-slip element defining a portion of the support surface. The anti-slip element may be a high-friction surface. The support may also include a mobile device resting on the support surface with the longitudinal ends supporting at least 85% of the width of the mobile device but less than 100% of the width of the mobile device.

BRIEF DESCRIPTION OF THE DRAWINGS

The drawing figures depict one or more implementations in accordance with the present concepts, by way of example only, not by way of limitations. In the figures like reference numerals refer to the same or similar elements.

DETAILED DESCRIPTION

A mobile device support is provided herein. The mobile device support may be configured to support a mobile device via a support element at an elevated position or inclined angle above a support surface such as a table, desk, or countertop. The mobile device may include any handheld device such as smart phones or larger devices such as tablets (other types of devices or media such as non-electronic media may be usable as well.) The mobile device may include protective or decorative covers as well. While, discussed in terms of being mounted on a horizontal surface herein, the mobile device may be mounted on non-horizontal surfaces as well. The device could be used with other bracketing systems to be mounted on substantially vertical surfaces as well. The mobile device support may limit the movement of the mobile device when the mobile device is positioned on the support element. The interface between the mobile device and the support may be caused by the mobile device resting on the support element by gravity; in this way, the support element can limit movement of the mobile device and retain the interface and engagement by friction. Other known interactions and devices may also replace or supplement the interface caused by gravity, such as tacky surfaces magnets or the like.

The mobile device support may include a gap near the support element that allows a user to pick up the mobile device using the front (i.e. face up) and back (i.e. face down) surfaces of the mobile device from its resting position on the mobile device support. The gap may be configured on the mobile device support such that it does not interfere with a base of the mobile device support. In some examples, the base is a multi-positionable base on which the support element is mounted. In these examples, the base has at least two angles allowing a viewer to view a mobile device from multiple angles when mounted on the support element and when the base is seated on a horizontal surface. The first angle may be optimized for when the user is seated, such as at a desk. The second angle may be optimized for when the user is standing, such as at a countertop.

Figure 1:
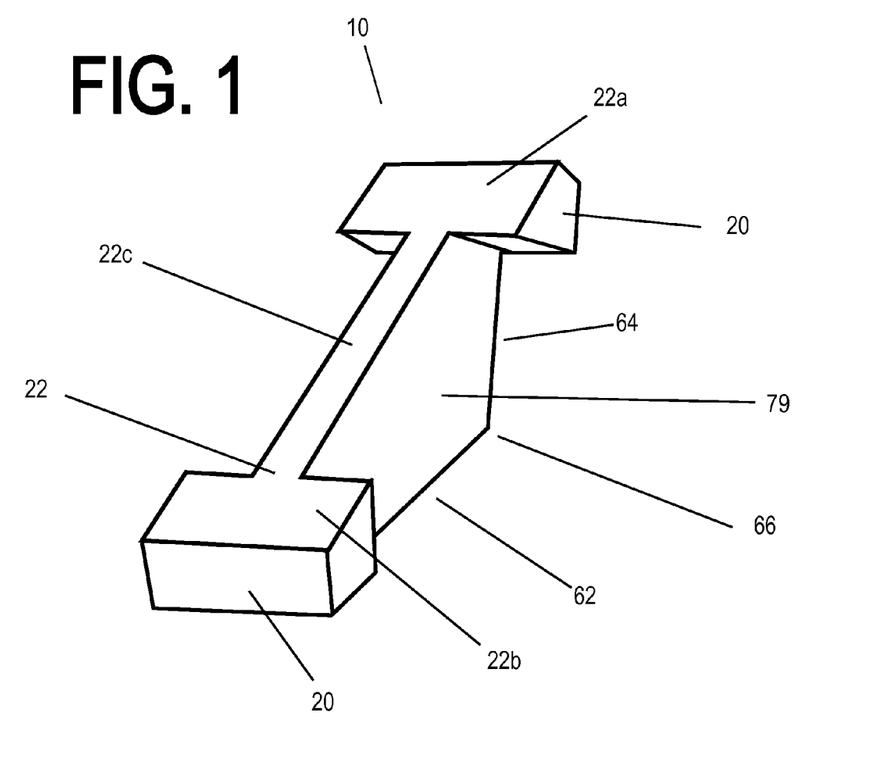
FIG. 1 is a perspective view of a mobile device support in accordance with an exemplary embodiment.
Figure 4:
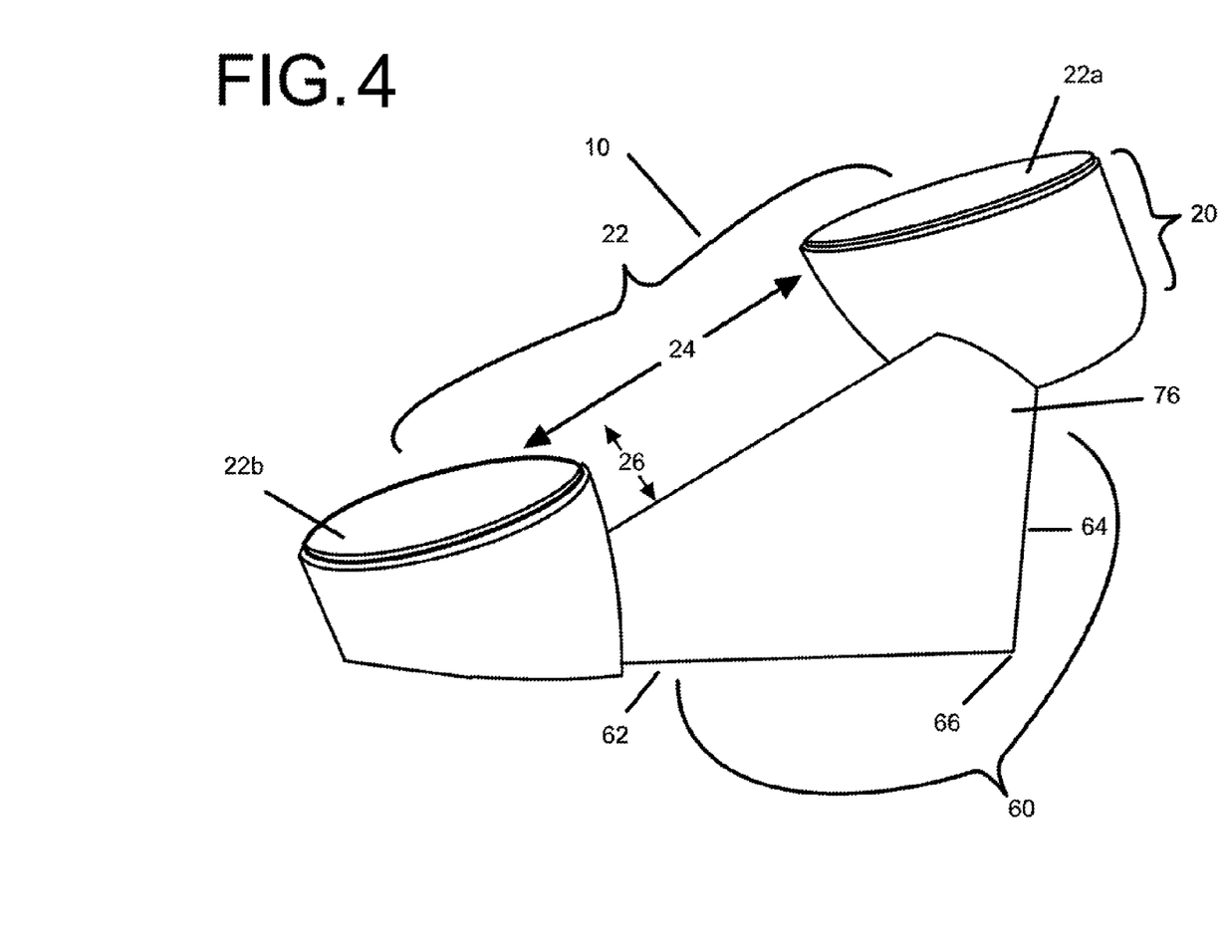
FIG. 4 is a perspective view of a mobile device support in accordance with another exemplary embodiment.

As illustrated in FIGS. 1 and 4, a mobile device support 10 may include a support element 20 and a base 60. The support element 20 and the base 60 may be contiguous and formed as a unit, such as integral parts or a unitary structure. They may alternatively be separate components that are joined together to form the handhold device support 10. The support element 20 may include a support surface 22 operable to position a mobile device thereon. The mobile device may include only the handheld device or it may include the handheld device with a cover or other similar accessory.

Figure 2:
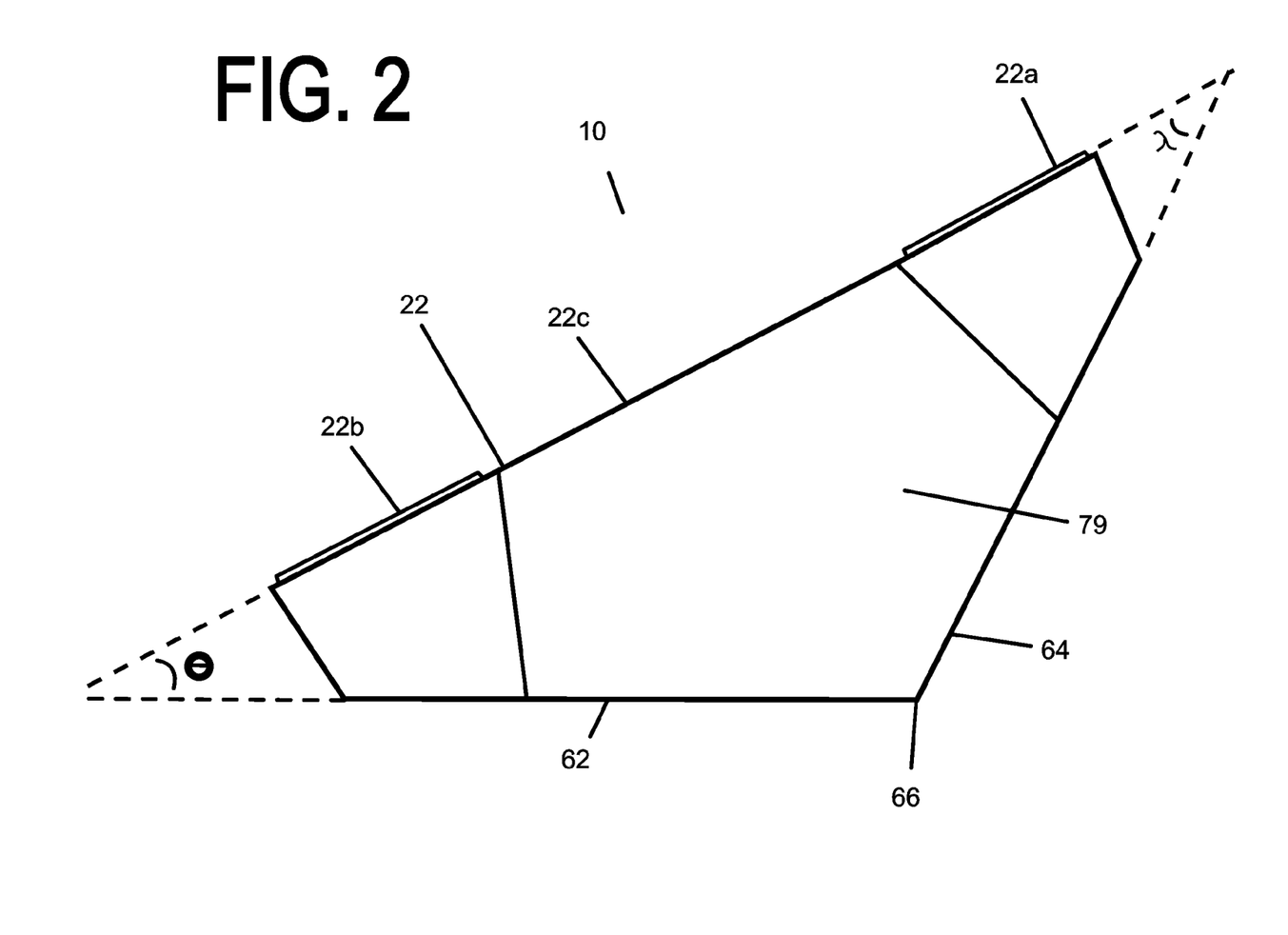
FIG. 2 is a side view of the mobile device support of FIG. 1.
Figure 3A:
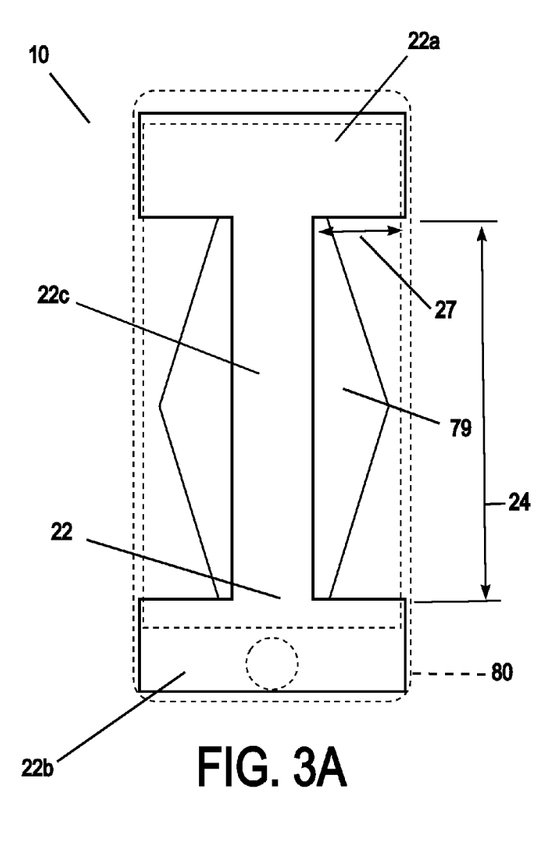
FIG. 3A is a front top view shown through a mobile device positioned on a support surface having finger clearance gaps on both lateral sides.
Figure 3B:
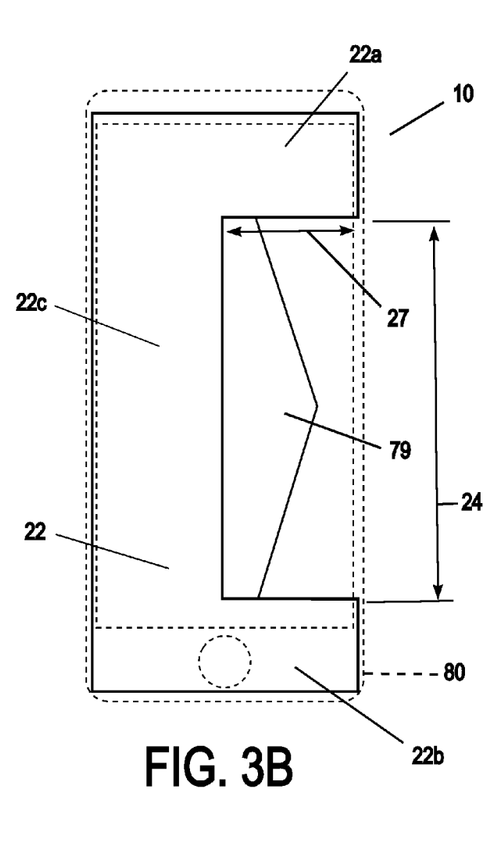
FIG. 3B is a front top view shown through a mobile device positioned on a support surface having a gap for finger clearance on one side.

In accordance with various embodiments, the support element 20 is suitable to provide four corner support to the usable features of the mobile device. For example, the support element 20 is a sufficient size to offer suitable support for usage of the entire front face of the device. "Usage" of the front face 83 of the device 80 (see e.g., FIG. 7) in this context may include, for example, a user pressing with one or more fingers on a real or virtual button on the face 83 of the device, such as the "home" button 85, aggressively tapping (for instance in gaming applications, music applications such as drumming interactions, etc.), swiping, typing, or applying other force to the face 83 of the device to effect an input or interact with the device. Providing the suitably sized and configured support allows the user to press with one finger without having to pinch the mobile device with a second finger or to hold it on the support with another hand. The four corner support does not necessarily mean that the entire back surface of the mobile device is supported, but instead the mobile device may provide its own support by bridging gaps in the support with the support merely sufficient to provide support at the corners of the usable area (screen plus other front face buttons) of the device. In one example, the support element 20 includes surfaces merely present at the longitudinal ends of the mobile device, with surfaces that extend to the lateral width of the device or at least its usable area as shown in FIGS. 4-8. In another example, the support element 20 includes a surface that extends the entire longitudinal length and lateral width of the mobile device or its usable area as shown in FIGS. 1-3. In another example, the support element 20 includes a surface that covers substantially all the back of the mobile device with no gaps. In another example, the support element 20 includes a plurality of discreet points of contact that are positioned at the exterior circumference of the mobile device such as its four corners. Support element 20 may be sized to adequately support a mobile device in landscape orientation independently or paired with support surface 22b to support a mobile device in portrait orientation.

Figure 7:
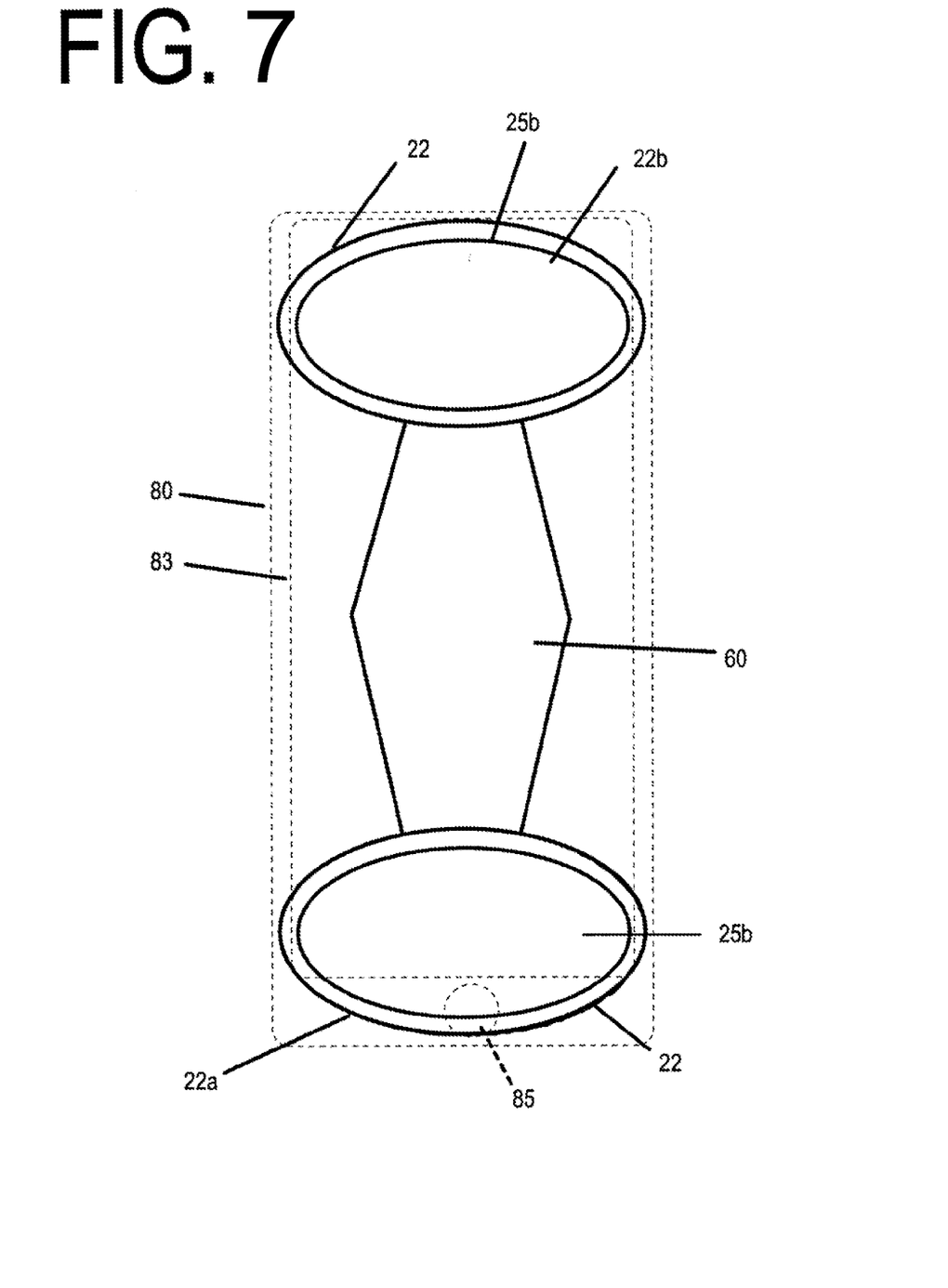
FIG. 7 is a front top view shown through a mobile device positioned on a support surface on the mobile device support of FIG. 4.

The support surface (or surfaces) may be positioned to provide support not only to the sides (i.e. lateral support) and ends (i.e. longitudinal support) of the mobile device but also to the middle of the device near the bottom edge of the device. This location is where a mobile device's "home button" 85 is sometimes located. Such support may allow for full front-face mobile device usage that includes actuating the "home" button with a single finger push. The support surface(s) may include rounded edges, such as to increase comfort to a user whose hand may come in contact with them, or may be angular. FIGS. 3 and 7 illustrates examples of the longitudinal and lateral support of surface 22 (or as shown in the figure, a plurality of support surfaces 22a, 22b) relative to an example of mobile device 80 shown in dotted line. In the various embodiments illustrated, the areas 83 of the mobile device that may encounter virtual button manipulation (e.g., presses or swipes) or physical manipulation (e.g., the home button 85) are fully supported by the longitudinal length of the support surface 22 and the lateral width of the support surface 22. The front surface of the device may have bezel regions and manipulable surface area that may include the physical buttons or the virtual buttons. The overall supportive length and width of surface (or surfaces) 22 may provide support to the corner regions (i.e. near the corners) of the mobile device 80. While the support surface(s) may not extend entirely to the very corners of the mobile device 80, the longitudinal extent and the lateral extent of the support surfaces(s) may provide sufficient support to the corner regions of the mobile device such that virtual or physical buttons in those areas are can still be utilized.

While shown in the exemplary figures as being elongated in the longitudinal direction (i.e. the direction shown to provide an inclination for support of the mobile device in FIGS. 1, 2, 4, and 5), the device support 10 accommodates both portrait and landscape positions of mobile device orientations. Full front-face support may be on only one or the other orientations. For example, in landscape orientation the support 10 may only provide support to engage in normal usage (e.g., swipes, taps, etc.). In this orientation a user may support home button presses with a pointer finger and thumb (as one does when holding a device in one's hand). However, in other embodiments, the support surfaces may be positioned laterally as opposed to longitudinally as shown in the FIGS. 4-8. With the support surface 22 extended or positioned laterally, a one finger press of the functionality button (e.g., "home" button) may be possible as the lateral sides of the mobile device would be supported, thereby supporting the home button in a landscape mode. In such an embodiment, the one finger pressing might be avoided in the portrait orientation of the mobile device.

In accordance with various embodiments, the support surface 22 may be a single surface as shown in FIG. 1 or multiple surfaces as shown in FIGS. 4-8. In one example of a multiple surface embodiment such as those shown in FIGS. 4-8, the support element 22 includes a first support element surface 22a and a second support element surface 22b. The two surfaces may be separate support surfaces 22a, 22b. Even as separate surfaces, the first surface 22a may be oriented with respect to the second surface 22b so that both surfaces reflect the surface of the handheld device. Meaning, both surfaces 22a, 22b are positioned to contact and support the back surface of the hand held device. In one example, one or more of the first support element surface 22a and the second support element surface 22b may be planer. The first surface 22a may also be positioned in substantially the same plane as the second surface 22b. In another example, one or more of the surfaces 22a, 22b are not planer but are curved, as shown in FIGS. 5B and 6B. The surfaces may be complementary such that they are operable to cradle and suture different portions of a curved handheld devices in different places. As shown in FIG. 5B, as a more particular example, the surfaces 22a and 22b may be latitudinally curved (i.e. curved in the transverse direction across the support device) to better cradle and support a handheld device having a complimentary latitudinal curve. In another more particular example, as shown in FIG. 6B the surfaces 22a and 22b may be longitudinally curved (i.e. curved in the longitudinal direction along the support device) to better cradle and support a handheld device having a complimentary longitudinal curve. In other examples, the surfaces 22a and 22b may have a combination of one or more of planer portions, curved portions, and/or combination of the same.

In accordance with various embodiments, the first support element surface 22a and the second support element surface 22b may be spaced apart from each other forming a gap there between. For example, the first and second support element surfaces 22a and 22b may be disposed distally from each other such that the first and second support element surfaces 22a, 22b are operable to support opposite ends of the mobile device while providing access to the face down side of the mobile device between the two surfaces. In this embodiment, the gap is a longitudinal separation 24 between the support surfaces 22a, 22b. In one example, the gap includes a sufficient depth 26 to allow a user's finger or hand to access a back side of the mobile device. In one example, the gap includes a longitudinal length that is at least 2 inches long as measured at the narrowest points between the support surfaces. In other examples, the gap includes a longitudinal length that is at least 3 inches long as measured at the narrowest points between the support surfaces. In a preferred embodiment, gap is about 2.6 inches long as measured at the narrowest points between the support surfaces.

Figure 5A:
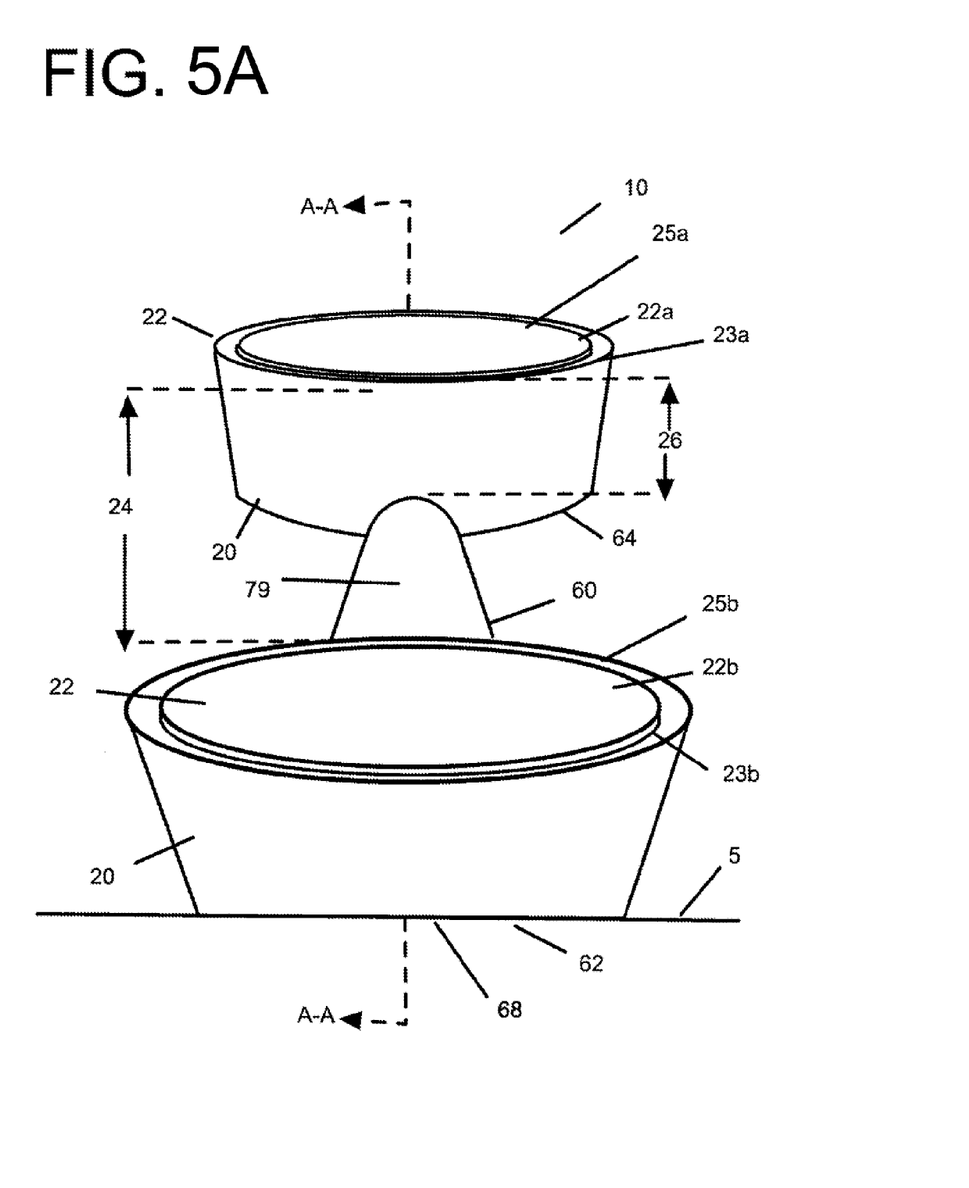
FIG. 5A is a front view of the mobile device support of FIG. 4.
Figure 5B:
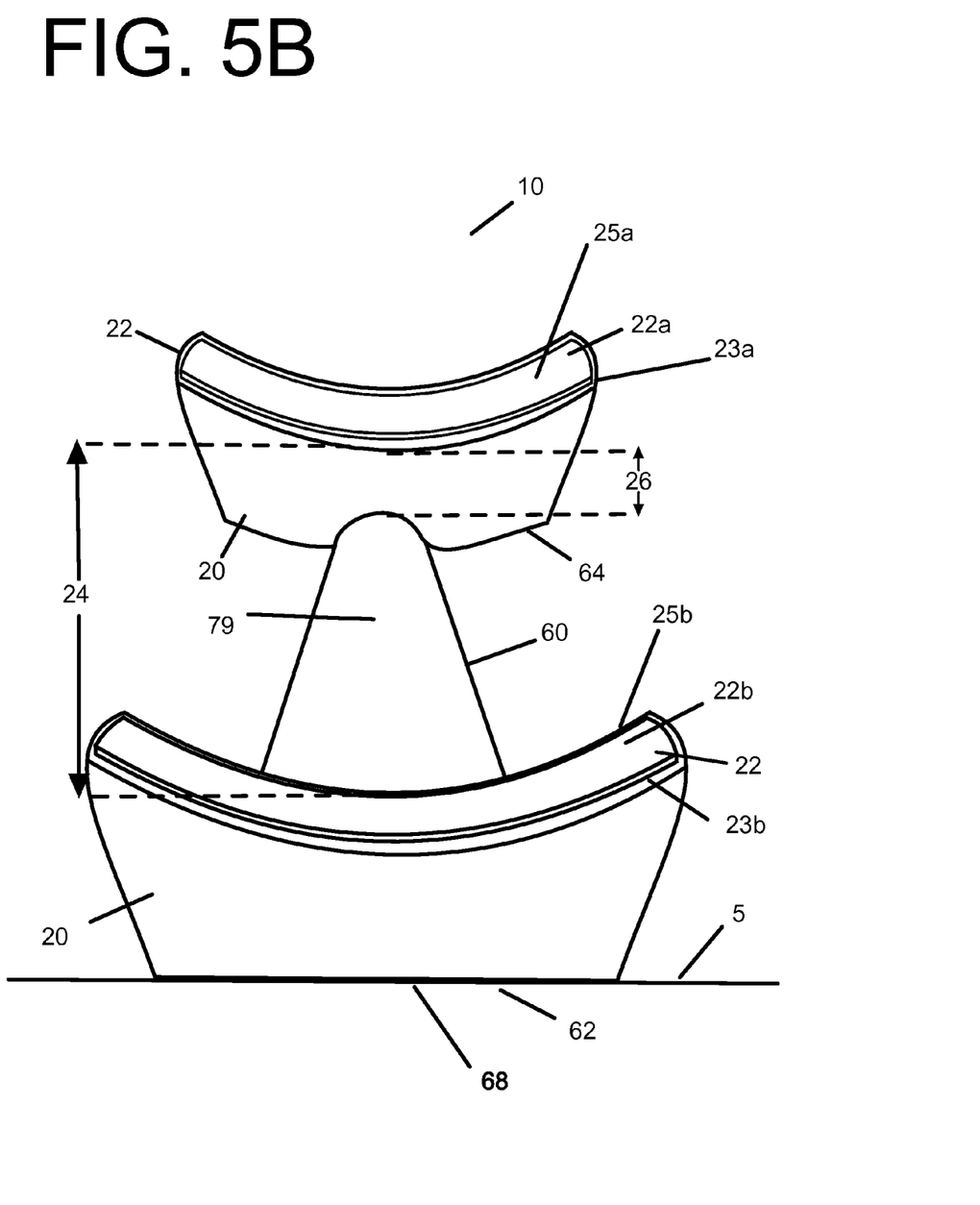
FIG. 5B is a front view of the mobile device support having a surface with a latitudinal curve.
Figure 6A:
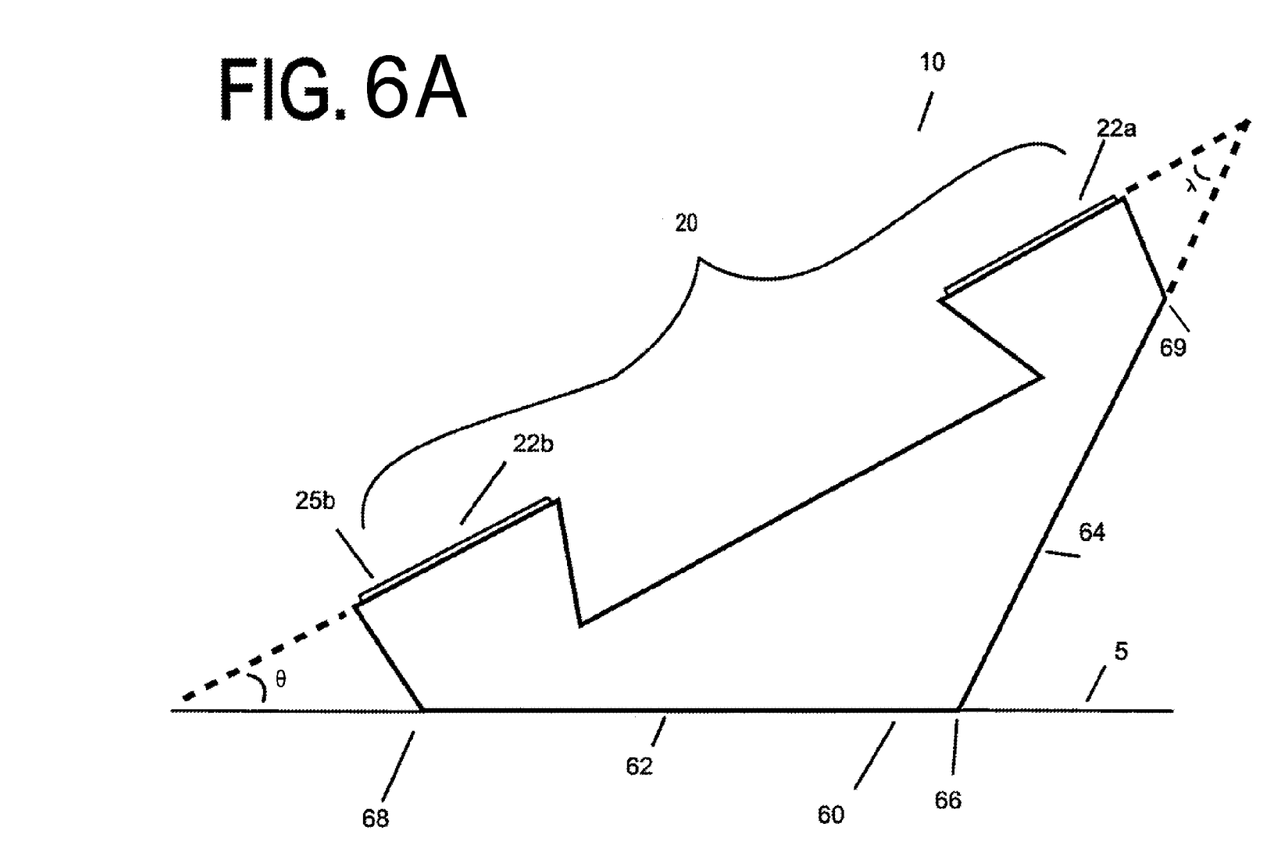
FIG. 6A is a side view of the mobile device support of FIG. 4.
Figure 6B:
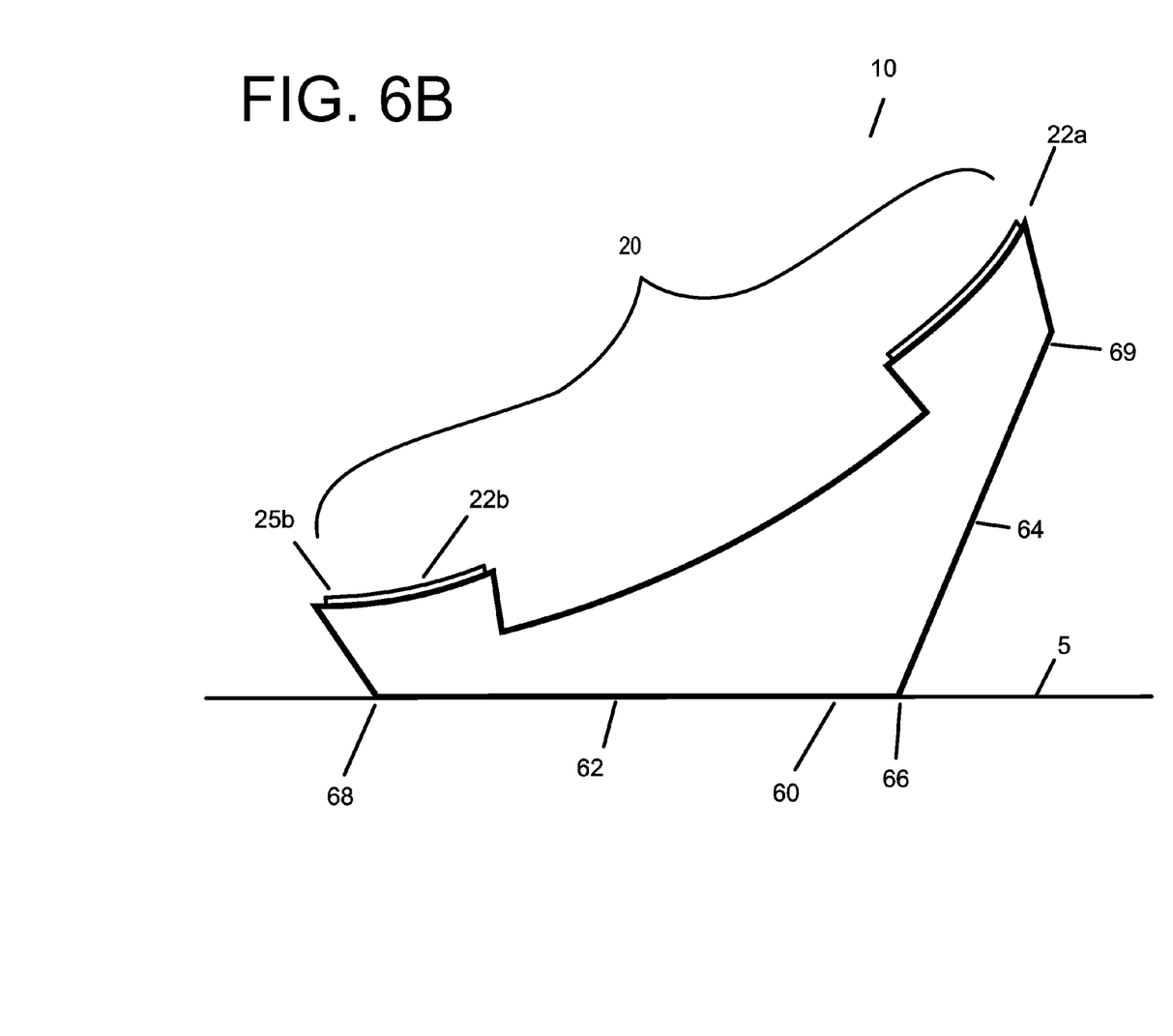
FIG. 6B is a side view of the mobile device support having a surface with a longitudinal curve.

In accordance with another embodiment, the support surface 22 may be a singular continuous surface (e.g. FIGS. 1-3), two separate surfaces (e.g. FIGS. 4-8), or can be comprised of three or more separate surfaces. Each of the various surfaces may take any shape. In particular the shape may be configured to allow for finger access behind the mobile. In various embodiments as shown in FIGS. 1-3, a continuous surface includes one or more gaps for finger access behind the mobile device. For example, as shown in FIGS. 1-3A, the surface 22 may be I-shaped, providing gaps for finger access on both sides of the support device 10. In another example, as shown in FIG. 3B, the surface 22 may be C-shaped, providing a gap form finger access on one side of the support device. In one example, as shown in FIG. 5, the support surface is formed as two, flat, elliptical-shaped surfaces 22a, 22b which cooperatively support the mobile device placed resting thereon. Other shapes are contemplated herein as well. The gap may also have a lateral width 27 sufficient for a user's finger or hand to securely engage the back of the mobile device 80. The gaps shown in the examples have straight edges that define the walls that define the gap, however, curved edges can also be included. The gaps may also be specifically shaped to conform to a user's fingers, grip, or hand size and shape. In various embodiments, the surface 22 may have longitudinal end surfaces 22a, 22b that have sufficient lateral width to support the lateral edges of the usable features of the device. This lateral width of the longitudinal end surfaces 22a, 22b may taper to a narrow bridge support 22c as shown in FIGS. 3A and 3B or the surfaces 22a, 22b may be discrete with the outer surface of the support device 10 falling away from the plane defined by surfaces 22a, 22b and forming a body portion 79 of the support device 10, which as shown could be a ridge or spine to base 60 as shown in FIG. 5. In this way the support element 20 including surfaces 22a, 22b may protrude from the body portion 29. With a gap there between for finger access as shown in FIGS. 4-8.

In various embodiments, the device support 10 widths are less than that of the mobile device, allowing invisibility of the support device 10 when the mobile device is placed thereon. This also allows for the support device 10 to be minimized with regard to the support device's footprint improving portability and space considerations. In one example, the first and second support element surfaces 22a, 22b have a width at least 50% the width of the mobile device. More particularly, the first and second support element surfaces 22a, 22b may have a width that is at least 85% the width of the mobile device. In various embodiments, the first and second support element surfaces 22a, 22b has a width that is less than 100% the width of the mobile device. More particularly, the first and second support element surfaces 22a, 22b has a width that is less than 95% the width of the mobile device. In accordance with various embodiments, the support device 10 (including the support element 20 and or the base) is at least as wide as the screen (i.e. extends at least as wide as bezel outside of the screen). In accordance with alternative embodiments, the bounds of the support device 10 (i.e. the lateral width and longitudinal length) extends to or beyond the edges of the mobile device (i.e. the support element 20 is at least 100% of the mobile device). This particular structure increases stability.

In accordance with various embodiments, the first and second support element surfaces 22a, 22b may have an aspect ratio of their width (i.e., width across each surface) to their length (i.e., the length from the longitudinal extreme of one surface such as 22a to the other surface 22b) that substantially matches or is less than the aspect ratio of the mobile device used therewith. For example, the mobile device may have an aspect ratio may be approximately 2.64 in. width to 5.44 in. length matching the aspect ratio of an iPhone 6. In this embodiment, an aspect ratio may be less than 2.6 in. width to 5.4 in. length allowing for the mobile device to obscure the support device 10. Other sizes may be used for other personal communication devices or digital assistants, for instance.

When placed on a horizontal surface 5, the base 60 of the support 10 limits movement of the mobile device relative to the horizontal surface 5. As discussed above, the support element 10 offers suitable support for usage of the entire front face of the device. During usage of the mobile device, the base 60 limits movement of the mobile device relative to the underlying surface 5 despite pressure from the user against the front faces of the device. The base 60 may be any structure suitable to support a mobile device via the support element 20. When used on a horizontal surface 5, the support 10 can display the mobile device in a plurality of different orientations. The base 60 may include a plurality of base surfaces 62 and 64, each being operable to support the support 10. The base surfaces 62, 64 may be generally flat (i.e. provide a planar contact with the underlying surface) or the surfaces may be defined complex shapes (e.g., having protrusions or the like extending therefrom) that are configured to be in contact with the underlying surface at discrete points or discrete lines as opposed to a planar contact. Each of the plurality of base surfaces (e.g., 62, 64) may provide sufficient contact with the underlying surface such that each of the plurality of base surfaces 62, 64 limits longitudinal rocking or lateral rocking of the mobile device when the outer edges of the mobile device's screen are pressed during usage. For example, the base surfaces 62, 64 may have three or more points which contact the underlying surface 5 at sufficient lateral widths to limit the side-to-side rocking and at sufficient lengths to limit end-to-end rocking. The widths may be approximately the same width as the width of the mobile device and the length may be approximately the same length as the mobile device. In other embodiments, the base surfaces 62 and 64 are at least 50% the width of the mobile device. More particularly, the base surfaces 62 and 64 are at least 85% the width of the mobile device. In various embodiments, the base surfaces 62 and 64 are less than 99% the width of the mobile device. More particularly, the base surfaces 62 and 64 are less than 95% the width of the mobile device.

The first base surface 62 may define a first contact plane. The plane may be defined by the three or more contacts between the first base surface 62 and an underlying flat surface (e.g., surface 5). Similarly, the second base surface 64 may define a second contact plane. The second contact plane may be defined by the three or more contacts between the second base surface 64 and an underlying flat surface (e.g., surface 5) when positioned thereon. The second contact plane may be at an angle relative to the first contact plane. The angle between the two contact planes may be an obtuse angle. While it is understood that contact points of each of the first and second surfaces 62 and 64 define their contact planes and while the first and second surfaces 62 and 64 may be generally planar or may have complex surfaces that can include protrusions configured to contact the underlying surface 5, these general concepts will be encompassed by and referred to herein by the terminology of base surface. While the surfaces themselves may be complex, the orientations of the base surfaces discussed below refer to the orientation of the contact plane defined by the base surface as described above.

As illustrated in FIG. 5, the first base surface 62 may be operable to rest on an underlying surface 5 and position the support element at a first angle $\theta$ with respect to the support element 20 while the mobile device is supported on the support element 20. The base 60 may include a second base surface 64 disposed at a second angle $\lambda$ with respect to the support element 20. The second base surface 64 is operable to rest on the underlying surface 5 to position the support element 20 at the second angle while the mobile device is supported on the support element. The first and second angles are different from each other. The first base surface 62 may be disposed at a first angle θ. The second base surface 64 may be disposed at a second angle λ with respect to the support element 20. The first angle θ may be a smaller angle than the second angle λ. The first angle θ may be suitable for viewing the screen of a mobile device when the mobile device is positioned below the user. For example, the mobile device may be positioned below a user when the user is standing and the device is positioned on a table, countertop, or other horizontal surface 5. The second angle λ may be steeper than the first angle θ. The second angle λ may be suitable for viewing the screen of a mobile device when the mobile device is positioned nearer to the eye level of the user. In one example, the first angle θ is at least 15°. More particularly, the first angle θ is at least 20°. In various embodiments, the angle θ is less than 45°. More particularly, the angle θ is less than and 30°. In a preferred embodiment, the first angle θ is approximately 29°. In various embodiments, the second angle λ is at least 15°. More particularly, the second angle λ is at least 30°. In various embodiments, the second angle λ is less than 45°. More particularly, the second angle λ is less than 40°. In one preferred embodiment, the second angle λ is approximately 38. In various other embodiments, other angles may be applicable and are used. In accordance with various embodiments, the two angles add up to less than 90 degrees.

Figure 8:
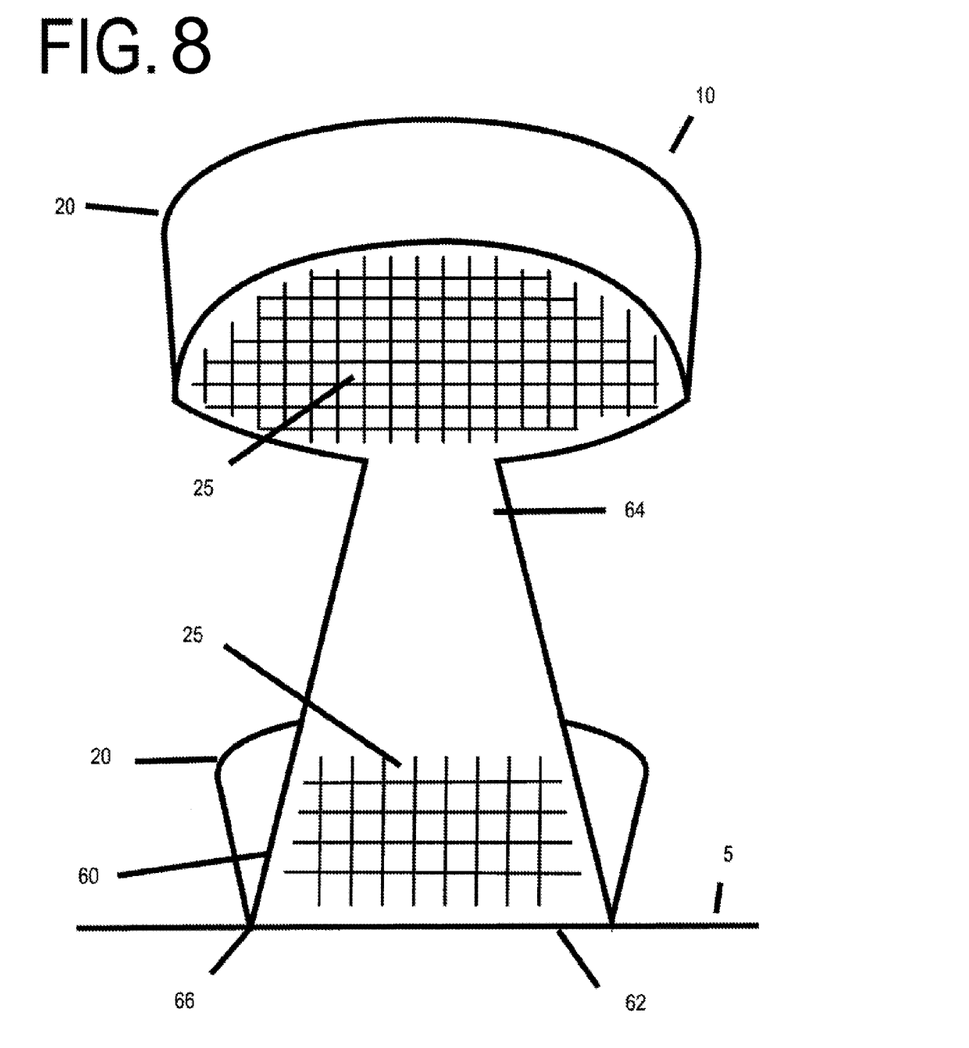
FIG. 8 is a rear view of the mobile device support of FIG. 4.

In one embodiment, as illustrated in FIGS. 4-8, the first and second base surfaces 62 and 64 have toe ends 68 and 69 respectively. The toe ends 68 and 69 are disposed distally from each other at the longitudinal ends of support 10. Each of the base surface 62 and 64 may also include heel ends that are disposed adjacent each other. The heel ends may define a heel region 66 of the device support. The heel region 66 may be located off center from the support element. As illustrated in FIGS. 4, 5, and 8, the base 60 may be wide at the heel region 66 and taper down toward each of the toe ends 68 and 69 and then widen out immediately proximate to the toe ends 68 and 69 at the support elements 22. In this configuration, the base surfaces 62 and 64 may provide lateral support at the heel region 66 (see FIG. 8) and the toe regions 68 and 69 while accommodating a lower profile there between. In some embodiments, the heel region 66 may be substantially contiguous, forming a peak between the first and second base surfaces 62 and 64.

In accordance with various embodiments, the support device 10 may include one or more high-traction elements 25. High traction may be used herein to define a limit slip characteristic between components such that in a static state the traction is sufficient to prevent movement of the mobile device relative to the support device 10 or the support device 10 relative to the underlying surface 5 during normal usage (e.g. single finger operation discussed above) of the mobile device when positioned on the support device 10. In various examples, the support element 20 and base 60 may be formed from a first material. The high traction element 25 may be a second material that is applied to the support element 20 or the base 60. For example, the high fraction element 25 may be formed on one or more of the support surface(s) 22 (e.g. 22a, 22b) on the support 20 or on the base surface 62, 64 on the base 10. The high traction element 25 may provide a desirable level of cushioning reducing impact or sound when placing the mobile device on the support 10 but still enable full utility of the actual and virtual buttons on the mobile device. Additionally, element 25 may also provide increased traction between the mobile device and the support 10 as compared to the traction that would occur between the mobile device and the example first material from which the rest of the support 10 is made. As used herein, the term traction may apply to any interaction between devices limits or prevents slippage via any type of interaction. Specifically, the high-traction element 25 may limit the mobile device's movement parallel and relative to the support surface 22, perpendicular movement (i.e. lifting the mobile device off of the mobile device support 10) remains unhindered. For example, the traction member 25 may allow the mobile device to be positioned on the support device 10 at an inclined angle with respect to the horizontal or parallel with respect to the horizontal and still be fully utilized. The high traction properties of the traction member 25 may be present regardless of the shape of the support element 20 or base surfaces 62, 64. In some examples, the second material may be a tacky material in which some perpendicular movement may be resisted as well. In various examples, suitable materials for the traction element 25 include an elastomer, such as a rubber or elastomeric polymer. In various examples, the elastomeric polymer is a soft elastomer such as silicone rubber attached with an acrylic adhesive. An example of the type of silicone rubber surface is Egrips® such as can be found at http://www.egrips.com/. In other examples, the elastomeric polymer is expanded vinyl material or a polyurethane material. Examples of such materials are disclosed in U.S. Pat. Nos. 6,673,409; 7,125, 602; and 7,252,867. In various embodiments, the support element 20 and the base surfaces 62, 64 have the same traction element 25. In alternative embodiments, the support element 20 and the base surfaces 62, 64 are different traction elements 25. For example, the support element 20 includes the silicone rubber traction element and the base surfaces 62, 64 include the expanded vinyl material or a polyurethane material.

Figure 9:
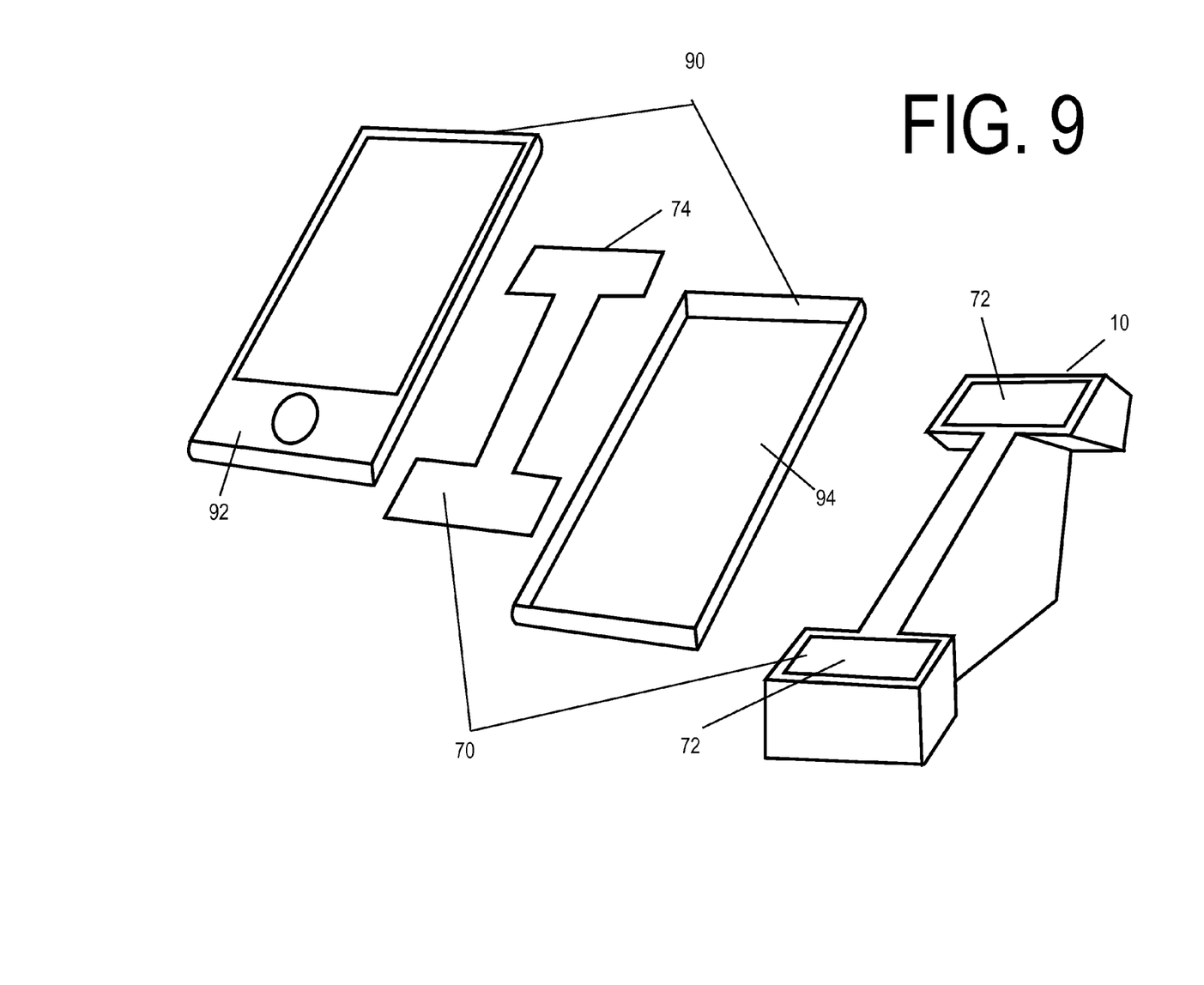
FIG. 9 is an exploded view of a device support with a magnetic circuit included therein.

In accordance with various other embodiments, other mechanisms may be utilized to secure the handheld device to the support element 20. For example, a magnetic attachment system may be used. For example as shown in FIG. 9, a magnetic circuit 70 may be used to retain the handheld device 90 on the support element 20. A portion of a magnetic circuit 72 may be located on, under, within or proximal to the support element 20. Another portion of the magnetic circuit 74 may form a part of the handheld device 90. The second portion of the magnetic circuit 74 may be located within the handheld device 90 including for example, a cover 94 for the handheld device or may be a part of a shell 92 of the handheld device 90. When placed on the support element, the first portion of the magnetic circuit 72 is attracted to the second portion of the magnetic circuit thereby securing the handheld device 90 to the support element 20. The first portion 72 or the second portion 74 may include a magnet such as a permanent magnet with the other portion including any device suitable to complete the magnetic circuit such as a metal plate or the like. The first portion 72 may include two separate magnetic circuit portions posited in each of the surfaces 22a, 22b on opposite ends of the device support 10.

The support surface(s) may also include recesses 23a, 23b with a depth that is approximately the same as or less than the thickness of the non-slip, anti-slip element, or high-traction pad 25a, 25b, so that the traction element 25 extends proud of a ridge surrounding the recess.

The support element(s) may include gaps or cutouts that create space for a mobile device peripheral (e.g. the camera lens of the iPhone 6 extends proud above the phone's back surface.) Cutouts or gaps may be included in the surface as needed to allow various devices to rest fully flat upon the support surfaces.

In various embodiments, the high-traction element 25 may be a contiguous portion of support device 10 (e.g., on the base surface 62, 64 or on the support surface 22a, 22b). As applied to any of the contact surfaces (i.e. surfaces contacting the mobile device or the underlying surface), the high-traction element 25 can be a textured surface sufficient to further increase traction as shown by way of example on the base surface 64 in FIG. 8. In this manner the traction element may be a high friction element, with high-friction denoting an elevated coefficient of friction. Some embodiments, the various surfaces of support device 10 that contact the mobile device or the underlying surface may be generally smooth.

In accordance with various embodiments, the mobile device support 10 may be heavy enough to create the friction to limit movement when in use. However, the mobile device support 10 may remain light enough to be portable, allowing a user to carry it easily between locations in the user's hand, or in a large pocket or bag.

The device support 10 may be sufficiently small, including the base 60 and the support element 20, to entirely hide the device (i.e. obstruct the view of the device support 10) behind the mobile device when the mobile device is positioned thereon. When a mobile device is placed on the mobile device support 10, the mobile device support 10 may be sufficiently small to be invisible to the device user, giving the appearance that the device is floating. This invisibility may be present in any viewing angle discussed herein. Each base may be configured to provide support while minimizing mobile device support 10 visibility. For example, the mobile device support 10 may be narrow enough and short enough to be fully obscured when viewed from the vantage point of the device user.

The support device 10 may also include an internal cavity and shifting weight features as described in the co-pending application that is incorporated by reference. The features described therein may be used in addition to or instead of features variously described herein. A person of ordinary skill in the art will appreciate that each of the various embodiments disclosed herein or in the incorporated reference may be utilized together, separately, or in any combination whether explicitly recited herein or not.

Any and all references specifically identified in the specification of the present application are expressly incorporated herein in their entirety by reference thereto. The term "about," as used herein, should generally be understood to refer to both the corresponding number and a range of numbers. Moreover, all numerical ranges herein should be understood to all numbers within the range.

All relative and directional references (including: upper, lower, upward, downward, left, right, leftward, rightward, top, bottom, side, above, below, front, middle, back, vertical, horizontal, height, depth, width, and so forth) are given by way of example to aid in understanding of the particular embodiments described herein. They should not be interpreted to be requirements or limitations, particularly as to the position, orientation, or use of the invention unless specifically set forth in the claims. Connection references (e.g., attached, coupled, connected, joined, and the like) are to be construed broadly and may include intermediate members between a connection of elements and relative movement between elements. As such, connection references do not necessarily infer that two elements are directly connected and in fixed relation to each other, unless specifically set forth in the claims.

While illustrative embodiments of the invention are disclosed herein, it will be appreciated that numerous modifications and other embodiments may be devised by those skilled in the art. For example, the features for the various embodiments can be used in other embodiments. Therefore, it will be understood that the appended claims are intended to cover all such modifications and embodiments that come within the spirit and scope of the present invention.

What is claimed is:

1. A device holder comprising:
   two spaced apart support elements each with a generally cylindrical-shaped surface;
   a spine comprising a top curved surface and connecting said two spaced apart support elements; said two spaced apart support elements extending beyond perimeters of the spine;
   a first gap formed along a first longitudinal side of the spine extending between each of said generally cylindrical-shaped surface
   a second gap formed along a second longitudinal opposite side of the spine extending between each of said generally cylindrical-shaped surface and
   said spine having a depth such that finger access is provided between said spine and each said longitudinal end surface;
   said spine comprising a base, having two flat surfaces configured to provide planar contact with an underlying surface, said base being of unitary construction with said spine;
   wherein one of said two flats surfaces is positioned at an obtuse angle with respect to another one of the two flat surfaces.

2. The device holder of claim 1, wherein said two spaced apart support elements are rounded and each meets at a rounded side of said spine.

* * * * *